G. E. RIGBY.
LOCKING DEVICE.
APPLICATION FILED JUNE 2, 1919.

1,356,087.

Patented Oct. 19, 1920.
2 SHEETS—SHEET 1.

Witnesses:—
Edward Maw
John Smith

Inventor:—
George Edwin RIGBY,
BY:
ATTY.

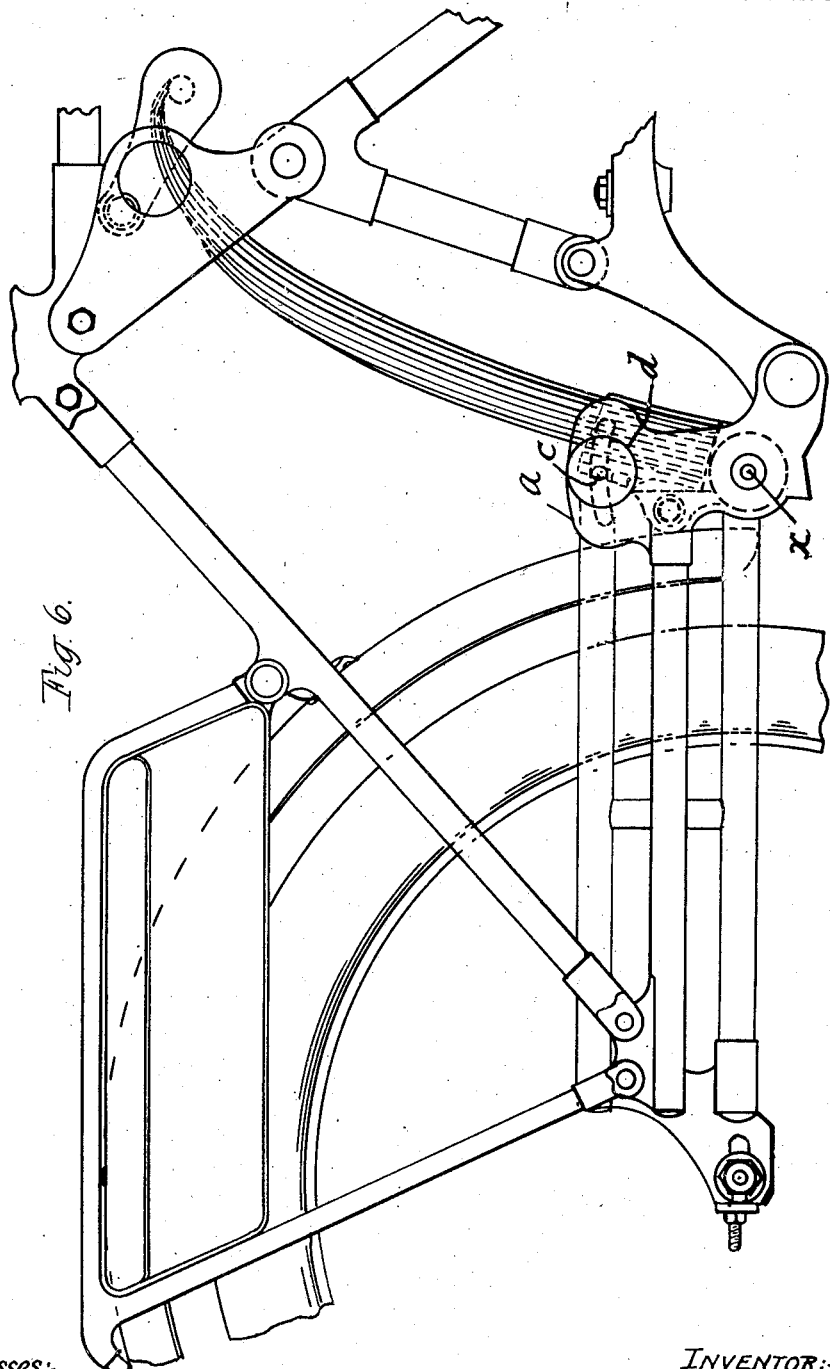

UNITED STATES PATENT OFFICE.

GEORGE EDWIN RIGBY, OF MANCHESTER, ENGLAND.

LOCKING DEVICE.

1,356,087.   Specification of Letters Patent.   Patented Oct. 19, 1920.

Original application filed June 11, 1918, Serial No. 239,365. Divided and this application filed June 2, 1919. Serial No. 301,288.

*To all whom it may concern:*

Be it known that I, GEORGE EDWIN RIGBY, a subject of the King of England, residing at Manchester, in the Kingdom of England, have invented a new and useful Locking Device, of which the following is a specification.

My invention has reference to devices for locking together pivoted or rocking parts or arms having an unique pivot and a slot and pin rocking connection and consists in securing such rocking parts rigidly together when necessary, by two bolt members adapted to be screwed one into the other, it being more particularly intended for use in connection with the spring frames of motorcycles and the like for locking the rocking members or parts of the frame when the spring breaks. In this manner the spring frame can be readily transformed into a rigid frame.

It will be obvious that the invention is capable of other adaptations, where two or more normally rocking members require to be converted into a rigid structure.

In connection with the rear springing of cycle frames, it has previously been proposed to connect parts pivotally at one end and by a pin and slot connection at the other end, the pin or bolt being adapted to be tightened for the purpose of clamping or locking the parts rigidly together, and it has also been proposed, in means for locking parts which are pivoted together and fitted with a pin and slot connection also, to provide the pin in the form of a bolt which screws into a block engaging with one pivoted part so that when the bolt is tightened the parts are rigidly clamped together.

Figure 1:
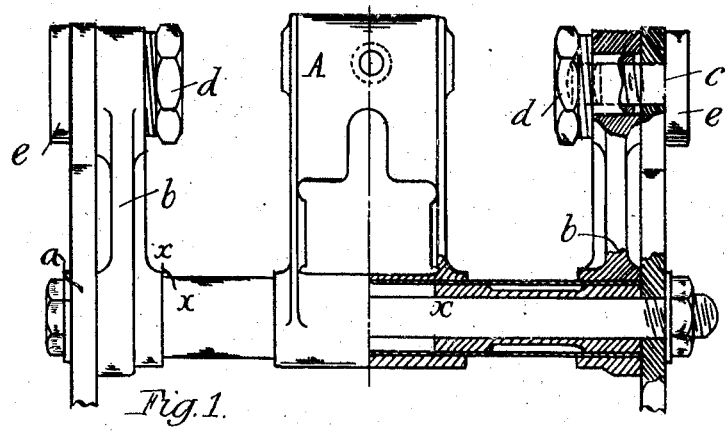
Figure 2:
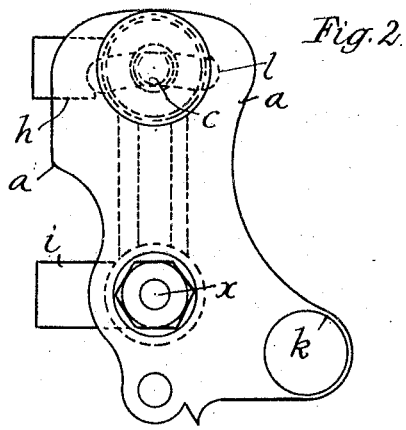
Figure 3:
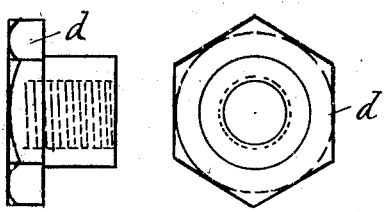
Figures 4, 5:
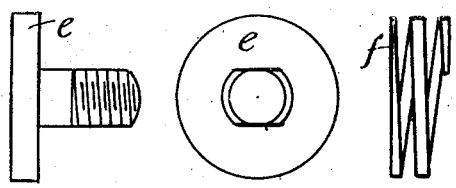

My improved construction will be hereinafter more fully described with reference to the accompanying drawings, in which:

Figure 1 shows the complete device, partly in section as applied to a motorcycle; Fig. 2 is a side view, and Figs. 3, 4 and 5 are details hereinafter referred to. Fig. 6 shows the application of the device to a motorcycle.

According to the construction shown in these drawings, I provide an outer slotted side member $a$ connected by a pin $c$ to an inner rocking member $b$ said members $a$ and $b$ having a common fulcrum $x$, and the pin connection being such that, when necessary or desirable, these two members or side plates can be rendered a fixture, that is, rigidly locked together.

For this purpose the connection $c$ consists of a bolt-member $d$ internally threaded to receive a second bolt-member $e$. The members $a$ and $b$ are adjacently disposed on the said bolts with a spring washer $f$ between the member $b$ and the head of the bolt $d$, the two bolts being lightly screwed together in such a manner as to allow relative rocking movement between the members $a$ and $b$.

When a rigid joint is required, it is only necessary to tighten the two co-acting bolts fully up so clamping the members $a$ and $b$ firmly together.

To explain the adaptation of the invention to the spring frame of a motorcycle, I will describe the same in connection with the rear springing means thereof set forth in my specification Serial No. 239365, June 11th, 1918, of which the present application is a division, the device being interposed between the rigid frame of the cycle and the spring-frame which carries rear wheel.

The housing for the spring is represented by reference A, Fig. 1, and a locking device is disposed on either side in connection with the duplicate stays $h$ and $i$.

The side plate or member $a$ is rigidly connected to a suitable part of the rigid middle frame, say at $k$, and has a curved slot $l$ in which engages the aforesaid connection $c$ which carries the member $b$ rigidly connected to the stays $h$, $i$. The connection $c$ is capable of an oscillatory movement in the slot $l$ according to the vibrations of the road wheel through the intervention of the side pieces or stays $h$ and $i$.

If the spring, held in the housing A, between the rear wheel and the middle cycle frame breaks or one of the stays $h$ or $i$ should break, the locking device $d$ and $e$ may be brought into use and a rigid connection obtained to enable the rider to complete his journey.

I claim:

A locking device consisting of rocking members or arms pivoted together at one end and at the other end combined with a slot and pin connection, two co-acting bolt-studs adapted to be screwed one into the other of said pin connection, and a fulcrum pin carrying the rocking members, in combination with an interposed spring washer fitted on one of the bolt members of the rocking connection, and a rigid frame and rear spring suspension of a motorcycle.

GEORGE EDWIN RIGBY.